United States Patent
Urbaniak et al.

(10) Patent No.: US 12,066,199 B2
(45) Date of Patent: Aug. 20, 2024

(54) AIRSTREAM SENSOR DEVICES, SYSTEMS AND METHODS

(71) Applicant: EBTRON Inc., Loris, SC (US)

(72) Inventors: Michael J. Urbaniak, Little River, SC (US); David S. Dougan, North Myrtle Beach, SC (US); John C. Lewis, Myrtle Beach, SC (US)

(73) Assignee: EBTRON Inc., Loris, SC (US)

( * ) Notice: Subject to any disclaimer, the term of this patent is extended or adjusted under 35 U.S.C. 154(b) by 367 days.

(21) Appl. No.: 16/035,183

(22) Filed: Jul. 13, 2018

(65) Prior Publication Data

US 2019/0017717 A1 Jan. 17, 2019

Related U.S. Application Data

(60) Provisional application No. 62/532,517, filed on Jul. 14, 2017.

(51) Int. Cl.
| | |
|---|---|
| *F24F 11/30* | (2018.01) |
| *G01K 13/02* | (2021.01) |
| *G01K 17/06* | (2006.01) |
| *G01N 25/20* | (2006.01) |
| *G01N 25/56* | (2006.01) |

(Continued)

(52) U.S. Cl.
CPC .............. *F24F 11/30* (2018.01); *G01K 13/02* (2013.01); *G01K 17/06* (2013.01); *G01N 25/20* (2013.01); *G01N 25/56* (2013.01); *F24F 2110/10* (2018.01); *F24F 2110/20* (2018.01);

(Continued)

(58) Field of Classification Search
CPC ....................................................... F24F 11/30
See application file for complete search history.

(56) References Cited

U.S. PATENT DOCUMENTS

| | | | | | |
|---|---|---|---|---|---|
| 5,436,852 | A | * | 7/1995 | Kon ........................ | G01W 1/17 |
| | | | | | 236/91 C |
| 5,583,301 | A | * | 12/1996 | Strauss ................... | G01F 1/662 |
| | | | | | 73/861.29 |

(Continued)

FOREIGN PATENT DOCUMENTS

| | | |
|---|---|---|
| EP | 0415747 A2 | 3/1991 |
| WO | 2014164788 A1 | 10/2014 |

OTHER PUBLICATIONS

*Blend definition in American English | Collins English Dictionary*, https://www.collinsdictionary.com/us/dictionary/english/blend (accessed Mar. 2, 2024).*

(Continued)

*Primary Examiner* — Hyun D Park
(74) *Attorney, Agent, or Firm* — Fox Rothschild LLP; Carol E. Thorstad-Forsyth

(57) ABSTRACT

Airstream sensor devices, systems, and related methods are disclosed. The sensor devices, systems, and methods are incorporated in heating, ventilation, and air conditioning (HVAC) ducts and plenum spaces for providing data used to monitor, manage, troubleshoot and/or control such systems. In an example embodiment, an airstream sensor device includes a housing and a plurality of sensors disposed on the housing. The plurality of sensors is configured to detect the temperature, airflow, and relative humidity of an airstream passing on, over, or through the device.

32 Claims, 4 Drawing Sheets

(NOTE: DIRECTION OF AIRFLOW IS INTO THE PAPER)

(51) Int. Cl.
*F24F 110/10* (2018.01)
*F24F 110/20* (2018.01)
*F24F 110/30* (2018.01)
*G01F 1/68* (2006.01)
*G01K 13/024* (2021.01)
*G01P 5/16* (2006.01)

(52) U.S. Cl.
CPC ............. *F24F 2110/30* (2018.01); *G01F 1/68* (2013.01); *G01K 13/024* (2021.01); *G01P 5/16* (2013.01)

(56) References Cited

U.S. PATENT DOCUMENTS

| | | | |
|---|---|---|---|
| 5,675,979 | A | 10/1997 | Shah |
| 6,415,617 | B1* | 7/2002 | Seem ...................... F24F 3/044 62/186 |
| 6,543,932 | B1 | 4/2003 | Potter et al. |
| 6,658,931 | B1* | 12/2003 | Plumb ..................... G01F 1/698 73/204.22 |
| 2003/0051023 | A1* | 3/2003 | Reichel .............. G01N 33/0075 709/223 |
| 2004/0144112 | A1* | 7/2004 | He .......................... F24F 11/62 62/115 |
| 2006/0234621 | A1* | 10/2006 | Desrochers ............. F24F 3/044 454/239 |
| 2007/0137318 | A1* | 6/2007 | Desrochers .............. G01N 1/26 73/863.81 |
| 2007/0179754 | A1 | 8/2007 | Sper |
| 2007/0240490 | A1 | 10/2007 | Desrochers et al. |
| 2009/0064803 | A1 | 3/2009 | Pettit et al. |
| 2009/0065595 | A1 | 3/2009 | Kates |
| 2010/0088044 | A1 | 4/2010 | Vogel et al. |
| 2011/0174889 | A1 | 7/2011 | Kostelecky |
| 2012/0031984 | A1 | 2/2012 | Feldmeier et al. |
| 2012/0125558 | A1* | 5/2012 | Nortman ................... G01F 1/68 73/204.25 |
| 2012/0155506 | A1* | 6/2012 | Nelson ................... G01N 25/18 374/45 |
| 2013/0023198 | A1* | 1/2013 | Badenhorst ............. F24F 13/06 137/893 |
| 2014/0083292 | A1* | 3/2014 | Weiden .................... F24F 11/30 95/25 |
| 2016/0097554 | A1 | 4/2016 | Lyons et al. |
| 2018/0058711 | A1* | 3/2018 | Taplin ................ G05D 23/1931 |
| 2019/0017717 | A1 | 1/2019 | Urbaniak et al. |
| 2019/0309975 | A1 | 10/2019 | Salem et al. |
| 2019/0391052 | A1 | 12/2019 | Lavrovsky et al. |
| 2020/0116382 | A1 | 4/2020 | Yang et al. |

OTHER PUBLICATIONS

*Weighted Average definition in American English | Collins English Dictionary*, https://www.collinsdictionary.com/us/dictionary/english/weighted-average (accessed Mar. 2, 2024).*
International Search Report and Written Opinion dated Jul. 19, 2018 in counterpart PCT patent application Serial No. PCT/US2018/042107.
Supplemental European Search Report dated May 19, 2020 in counterpart European Patent Application No. 18832240.
International Search Report and Written Opinion issued in PCT/US2021/016372 dated Apr. 13, 2021.
"ASHRAE Handbook—Fundamentals", published by the American Society of Heating, Refrigeration and Air-Conditional Engineers (ASHRAE) in 2021, pp. 3.1, 3.2, 3.5, 18.18 and 18.19.
Extended European Search Report mailed Dec. 22, 2022 in corresponding European Patent Application No. 21750113.9 (12 pages).

* cited by examiner (NOTE: DIRECTION OF AIRFLOW IS INTO THE PAPER)

```
                                                70
                                                  ↘
    ┌─────────────────────────────────────────────┐
    │ RECEIVING, AT A TRANSMITTER, A PLURALITY OF │
    │ ELECTRICAL SIGNALS FROM AN AIRSTREAM SENSOR │
    │ DEVICE POSITIONED IN AN AIRSTEAM, THE ELECTRICAL │── 72
    │ SIGNALS BEING INDICATIVE OF A TEMPERATURE, A │
    │ THERMAL DISPERSION AIRFLOW, AND A RELATIVE  │
    │         HUMIDITY OF THE AIRSTREAM           │
    └─────────────────────────────────────────────┘
                          ↓
    ┌─────────────────────────────────────────────┐
    │    PROCESSING, AT THE TRANSMITTER, THE ELECTRICAL │
    │  SIGNALS TO OBTAIN A CALCULATED TEMPERATURE, A │── 74
    │ CALCULATED AIRFLOW, AND AN ENTHALPY OF THE AIRSTREAM │
    └─────────────────────────────────────────────┘
                          ↓
    ┌─────────────────────────────────────────────┐
    │   TRANSMITTING THE CALCULATED TEMPERATURE, THE │── 76
    │ CALCULATED AIRFLOW, AND THE ENTHALPY TO AN ACQUIRER │
    └─────────────────────────────────────────────┘
```

FIG. 6

```
                                                80
                                                  ↘
    ┌─────────────────────────────────────────────┐
    │ RECEIVING HUMIDITY, AIRFLOW, AND TEMPERATURE │── 82
    │  MEASUREMENTS FOR AN AIRSTREAM AT A FIRST DEVICE │
    └─────────────────────────────────────────────┘
                          ↓
    ┌─────────────────────────────────────────────┐
    │ CALCULATING ENTHALPY OF THE AIRSTREAM AT THE FIRST │
    │                    DEVICE                    │── 84
    └─────────────────────────────────────────────┘
                          ↓
    ┌─────────────────────────────────────────────┐
    │ COMMUNICATING THE HUMIDITY, AIRFLOW, TEMPERATURE, │── 86
    │ AND ENTHALPY TO A SECOND DEVICE VIA THE FIRST DEVICE │
    └─────────────────────────────────────────────┘
```

FIG. 7

AIRSTREAM SENSOR DEVICES, SYSTEMS AND METHODS

This application claims priority under 35 U.S.C. Section 119(e) from U.S. Provisional Patent Application Ser. No. 62/532,517, filed Jul. 14, 2017, the entirety of the foregoing application being hereby incorporated by reference.

TECHNICAL FIELD

The present invention relates to sensor devices and systems, and more particularly, to sensor devices, systems, and related methods for measuring parameters associated with an airstream passing through a duct, plenum space, or other location in a heating, ventilating, and air conditioning (HVAC) system.

BACKGROUND

It is estimated that more than one third of current global energy consumption is used to maintain indoor environments, for example, via heating, ventilation, and air conditioning (HVAC) systems. Any improvements in the efficiency and control of HVAC systems have the potential to reduce the overall use of energy. Manufacturers of HVAC systems and components seek ways to provide consumers with controlled, energy efficient systems without having to compromise the indoor air quality and/or the comfort of building occupants.

One area in which energy savings can be realized is by utilizing outside air to cool or heat the interior of a building or structure, which allows air conditioning compressor(s) and/or heating elements to be powered off. For example, some HVAC controls utilize data from temperature sensor devices to determine when to heat or cool an indoor space using outside air, by basing the decision on whether the temperature of the outside air is higher or lower than the temperature of the inside air. This type of determination can be problematic; however, as making decisions based on temperature alone may result in discomfort to building occupants when the outside air used to heat or cool the occupied space is too humid.

Other HVAC controls utilize data transmitted from separate humidity and temperature sensor devices when making decisions on whether to cool an indoor space using outside air, which may result in inefficient use of equipment, physical space, and electrical controls. Furthermore, the data collected by the separate sensor devices may be inconsistent and/or skewed, since the locations positions of the separate devices throughout the HVAC system varies, and is not been optimized for accuracy and/or repeatability. Moreover, existing systems often collect data from humidity sensors mounted on duct walls, which may fail to capture data associated with the bulk of the airstream.

Generally, airflow, temperature, and humidity information is required to efficiently operate HVAC equipment. Enthalpy measurement is required for many air handling units (AHU) that use one or more airside economizers (known as "free cooling") to determine the switchover point from substantially total mechanical cooling to a modulating economizer mode. Enthalpy is calculated using temperature and humidity using the following equation:

$$H = (0.24 \times T) + [W \times (1061 + 0.444 \times T)]$$

Where:
H=enthalpy (Btu/lb)
T=dry-bulb temperature (° F.)
W=specific humidity (lbwater/lbdry air)

Stand-alone sensors are ordinarily used determine the airflow rate, temperature, and humidity measurements. Airflow measurement devices include single or multi-point airflow measurement devices, such as differential pressure pitot tubes or piezo rings, thermal airflow sensors or vortex shedding sensors. In some cases, thermal airflow sensors provide a temperature signal, since temperature measurement if required for the determination of the airflow rate. Temperature measurement is typically obtained using a single-point sensor (unless provided with a thermal airflow sensor) or using an averaging "serpentine" temperature sensor probe that has multiple temperature sensors in series. Humidity is typically measured using a single-point sensor.

Typical measurement technology is relatively bulky, requiring multiple sensors, redundant power connections, and redundant signal connections. Redundant signal connections are most troublesome when the devices use a network connection to a host building automation system (BAS) or application controller (AC), as disruptions in such network can potentially impact the ability to gain measurements. Additionally, temperature measurement accuracy may be limited in many HVAC applications using typical technology, as a result of velocity and temperature measurement profiles that cannot be addressed using modern temperature and humidity technologies, and thus, temperature measurement error can be significant. For example, measurement uncertainty from pure arithmetic averaging in an air stream may, in certain cases, be such as illustrated in Table A below. The actual temperature must be "weighted" for the variations in air velocity, where:

TABLE A

Weighted temperature is calculated as follows:
$\Sigma i = 1$ to $n(Vi \times Ti)/n$
Where:
V = point velocity (FPM or SFPM)
T = point temperature (° F.)
Arithmetic vs. Weighted Temperature Example
Measurement Location: Mixed Air Stream

| Velocity Profile (FPM) | | | | Temperature Profile (° F.) | | | |
| --- | --- | --- | --- | --- | --- | --- | --- |
| 1646 | 1431 | 1418 | 1426 | 82.4 | 81.1 | 80.3 | 80.4 |
| 1184 | 1195 | 1217 | 1024 | 70.6 | 69.9 | 69.8 | 68.0 |
| 783 | 561 | 685 | 788 | 60.3 | 59.9 | 60.1 | 61.9 |
| 519 | 445 | 358 | 460 | 49.8 | 49.9 | 51.0 | 49.7 |

| | |
| --- | --- |
| Arithmetic Average: | 65.3° F. |
| Weighted (true) Average: | 70.1° F. |
| Difference: | 4.8° F. |

Temperature measurement error may have a significant effect on enthalpy calculations, since the true average temperature is required to accurately determine enthalpy. Systems with an airside economizer (free cooling system) often require enthalpy measurements in order to properly switch to and from free cooling mode, i.e., the switchover point. Systems that use enthalpy switchover require enthalpy measurement in the following airstreams, depending on the switchover method selected.

Return and outdoor air stream

Mixed air stream (location where outdoor air and return air come together)

Outdoor airstream

When enthalpy is measured in just one of these air streams, significant error can result from temperature measurement uncertainty. In most applications, enthalpy switchover is desired but is not ultimately used as a result of measurement error (which may sometimes be misdiagnosed as a limitation of the humidity sensor).

The combination of velocity-weighted temperature and humidity measurements make for better enthalpy determinations, and such measurements are provided for by a single device of the present disclosure.

In view of the foregoing, a need exists for improved airstream sensor devices, systems, and methods having a single point of control and employing multiple, different types of sensors for collecting multiple data points at various locations in an airstream. Such devices, systems, and methods can employ a combination of one or more temperature sensors, humidity sensors, and/or thermal dispersion airflow sensors for assuring that minimum ventilation requirements are met.

SUMMARY

In accordance with this disclosure, airstream devices, systems, and related methods are provided which address limitations discussed above. In certain implementations, airflow measurement technology, temperature measurement technology, and humidity measurement technology are combined into a single package, thus simplifying installation and wiring.

More specifically, the devices, systems, and methods set forth herein are improved over existing devices, as multiple, different types of airstream measurement sensor devices, including temperature sensors, thermal dispersion airflow sensors, and relative humidity sensors, can be co-located in a single device for improved multi-point airstream sampling and enthalpy estimates. The different types of airstream measurement sensors can be positioned in co-planar locations spanning a width, length, and/or height a plenum space or duct for more consistent air sampling and averaging. Notably, the devices, systems, and methods herein comprise multiple point thermal dispersion airflow, temperature, and humidity sensors in single airflow measurement device, including but not limited to a probe.

Certain implementations of the present disclosure include a system comprising a thermal airflow measurement sensor and a temperature sensor, wherein the system is used to determine the airflow rate of the thermal measurement device and is used with a humidity sensor to determine enthalpy.

Another implementation of the present disclosure includes thermistors to determine the airflow rate and temperature of a thermal airflow measurement device and any of a number of types of humidity sensor, and a further implementation includes a thermal airflow measurement device and a specific humidity sensor such as sold by EBTRON, INC. of Loris, South Carolina USA.

Yet another implementation of the present disclosure uses multi-point airflow and measurement device to determine the airflow and temperature of multiple points in an array, spaced either for equal area distribution or any other distribution to determine the velocity-weighted temperature and any of a number of types of humidity sensor. This allows the use of velocity weighted temperature to determine enthalpy.

A still further implementation of the present disclosure uses an array of humidity sensors to improve the humidity measurement using velocity-weighted humidity.

In some embodiments, multiple humidity sensors are co-located on a single device with one or more temperature and thermal dispersion airflow sensors, which improves the accuracy and performance of the sensor devices and systems. The data from the co-located temperature and humidity sensors is used to estimate the enthalpy of the airstream, and a single transmitter can transmit the airflow, temperature, humidity, and enthalpy data to an acquiring source (e.g., a controller, a reader, a server, a building management system, etc.) for making decisions.

Further, the devices in systems set forth herein can electrically communicate data from multiple sensors to a single processing point that receives the sensor data, processes the sensor data, and transmits various airstream parameters calculated using the sensor data to various acquiring entities that implement heating, ventilation, and air conditioning (HVAC) control, monitoring, and/or management. The airstream parameters include combinations of the airstream airflow, temperature, relative humidity, and enthalpy used for HVAC control, monitoring, and/or management. By virtue of the versatile mounting options associated with the devices and systems described herein, the sensor devices and respective sensors can be placed in challenging field locations for obtaining consistent measurements of the airstreams in such locations.

Further implementations of the devices and systems herein can measure and transmit individual data for various discrete multi-point sensors or a true average of the multi-point sensors. Implementations of the devices herein utilize high quality, stable, and durable sensor technology, not limited to hermetically sealed "bead-in-glass" thermistors for measuring temperature and airflow. The thermistors are factory calibrated and be less subject to drift. Without having to perform periodic field calibration, maintenance and labor costs can be reduced and operational consistency enhanced. Direct measurement is generally a more stable method of control and reduces wear and stress on other components.

Adding humidity measurement to an airflow station or measurement device facilitates the airflow, temperature, humidity and calculation of enthalpy to be obtained or processed and transmitted by a single device. The airflow, temperature, humidity and calculation of enthalpy may be transmitted from a first device, such as a processing device, to a second device. The temperature measurement obtained from the airflow station or measurement device may be individual temperature for one or more points in an airstream, an average temperature of multiple points in an airstream, or velocity-weighted temperature. Velocity-weighted temperature takes into account the velocity at the temperature measurement point compared to the others so that the temperature measurement can be weighted by the flow amount.

In an exemplary embodiment, an airstream sensor device is disclosed. The airstream sensor device comprises a housing and a plurality of sensors disposed on the housing. The plurality of sensors comprise at least one temperature sensor, at least one thermal dispersion airflow sensor, and at least one relative humidity sensor configured to detect the respective temperature, airflow, and relative humidity of an airstream. In some embodiments, more than one relative humidity sensor is disposed over the housing, and the sensors form a sensor array. The plurality of sensors detect electrical signals that are associated with and that can be correlated to airstream parameters, including the airstream temperature, airflow velocity, relative humidity, and enthalpy.

In certain embodiments, the housing is elongated and has first end and second ends. The first and second ends can be mounted to surfaces of a duct or a plenum space in an HVAC system. The parameters obtained via the devices described herein can be used to implement HVAC system control, management, or monitoring.

In some embodiments, the temperature and thermal dispersion airflow sensors form a pair of thermistors comprising first and second thermistors. The first thermistor is configured to measure changes in resistance associated with the airstream temperature and the second thermistor is preferentially heated to a temperature above the airstream temperature for measuring changes in resistance associated with the airstream airflow.

The relative humidity sensor can comprise a resistance or capacitive sensor configured to detect humidity. The sensor can comprise a polymeric humidity-sensing film in some instances. More than one relative humidity sensor can be disposed in a single sensor device. One or more relative humidity sensors can optionally be disposed proximate a center point of the housing. Additionally, one or more relative humidity sensors can be optionally disposed proximate the first or second ends of the housing. The sensors can be spaced apart at equal or unequal distances between the first and second ends of the housing.

In a further aspect, an airstream sensing system is provided. The system comprises an airstream sensor device and a transmitter. The transmitter is in electrical communication with the device, and is configured to receive and process electrical signals communicated by the device. The transmitter can output a calculated temperature, a calculated airflow velocity, a relative humidity value, a calculated enthalpy of the airstream, and/or combinations thereof. The calculated values can be transmitted simultaneously or not.

The plurality of sensors comprise at least one pair of thermistors configured to change resistance in response to an airstream passing over the device and at least one relative humidity sensor configured to change capacitance in response to the airstream passing over the device. The system further comprises a transmitter electrically connected to the airstream sensor device. The transmitter is configured to calculate an enthalpy of the airstream using a signal indicative of the change in resistance of the thermistors and a signal indicative of the change in capacitance of the relative humidity sensor. The transmitter and airstream device can be integrally formed as a single assembly, or the transmitter can be remotely disposed relative to the airstream device in an HVAC system.

In certain embodiments, the transmitter receives signals from a plurality of airstream sensor devices. The airstream sensor devices can in certain implementations comprise a length of between 0.6 inches and 16 feet. The airstream sensor devices can comprise between three and sixteen sensors. Multiple pairs of thermistors and multiple relative humidity sensors can be provided on or over a single airstream sensor device, in some embodiments. The airstream sensor devices can be positioned in an HVAC system, for example, being located in one or more ducts, plenum spaces, or any other location in an HVAC system not inconsistent with the subject matter herein.

In further aspects, an exemplary method of measuring airstream parameters is disclosed. The method comprises receiving, at a transmitter, a plurality of electrical signals from an airstream sensor device positioned in an airstream. The electrical signals are indicative of a temperature, a thermal dispersion airflow, and a relative humidity of the airstream. The method can further comprise processing the electrical signals to obtain a calculated temperature, a calculated airflow, and an enthalpy of the airstream and transmitting the calculated temperature, the calculated airflow, and the enthalpy to an acquirer. The method can further comprise displaying the temperature, airflow, and enthalpy values on a display screen of the transmitter.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions, that when executed by the processor of a computer, control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or the computing platform or may be distributed across multiple devices or computing platforms.

As used herein, the term "transmitter" refers to a physical computing device including one or more processors and memory. The transmitter can utilize software in combination with hardware and/or firmware for implementing various features and/or performing various aspects of the airstream sensor devices and/or systems described herein.

These and other embodiments are described in more detail in the detailed description which follows.

BRIEF DESCRIPTION OF THE DRAWINGS

FIG. 6 is a block diagram of an exemplary method of measuring airstream parameters using an airstream sensor device according to an embodiment of the presently disclosed subject matter.

FIG. 7 is a block diagram of an exemplary method of monitoring airstream parameters using an airstream sensor device according to an embodiment of the presently disclosed subject matter.

DETAILED DESCRIPTION

Figure 1:
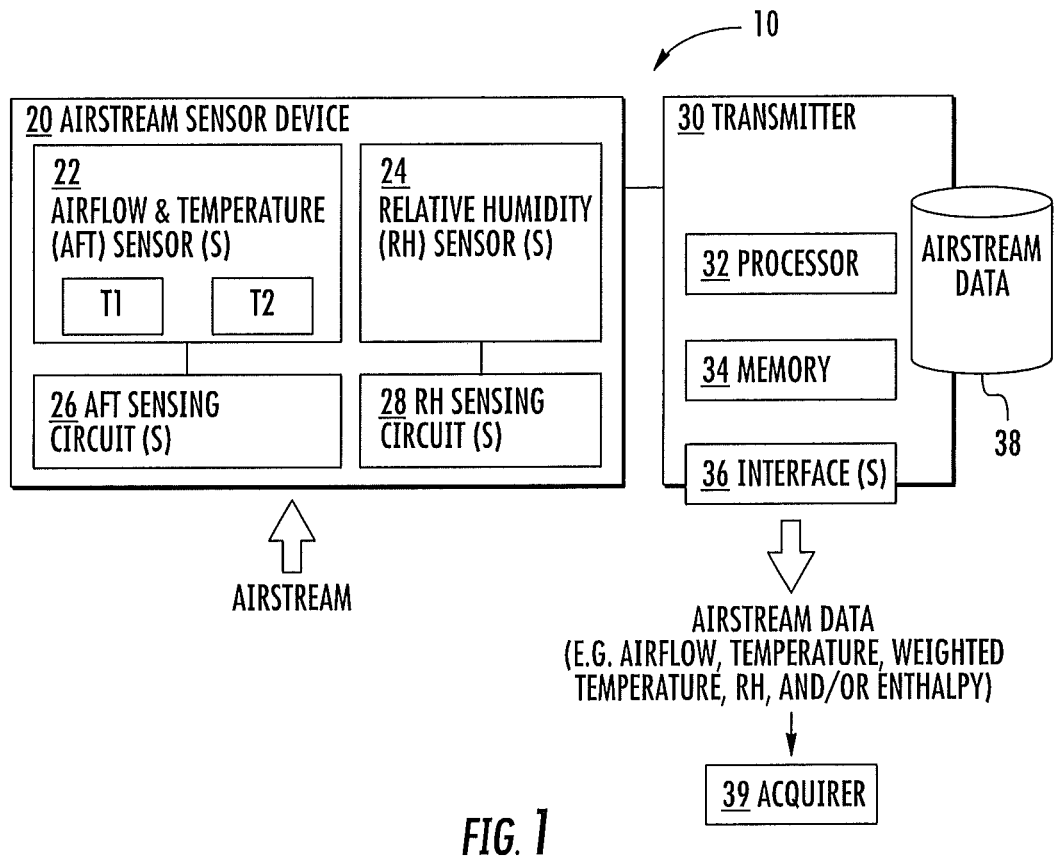
FIG. 1 is a block diagram of an airstream sensor device and system according to an embodiment of the presently disclosed subject matter.

Embodiments described herein can be understood more readily by reference to the following detailed description, examples, figures (also, "FIGs."), and the previous and following descriptions. It is understood, however, that the airstream sensor devices, systems, methods, and/or elements thereof as described herein are not limited to the specific embodiments presented in the detailed description and examples. It is recognized that these embodiments are merely illustrative of the principles of the instant subject matter. Numerous modifications and adaptations will be readily apparent to those of skill in the art without departing from the subject matter disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It is further understood that the terms "comprises," "comprising," "includes," and/or "including" when used herein specify the presence of stated features, elements, steps, operations and/or components, but do not preclude the presence or addition of one or more other features, elements, steps, operations, components and/or groups thereof. Further, as used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It is further understood that the terms used herein should be interpreted as having a meaning that is consistent with their meaning in the context of this specification and the relevant art and will not be interpreted in an idealized or overly formal sense unless expressly so defined herein.

The terms "resistance sensor" and "resistor sensor" refer to a sensor in which the resistance increases or decreases in response to changes in temperature. The change in resistance can be measured via a resistance sensing circuit in which the resistance sensor is disposed, connected, and/or in electrical communication with. Similarly, the terms "capacitance sensor" or "capacitor sensor" refer to a sensor in which the capacitance increases or decreases in response to changes in the surrounding moisture level or humidity. The changes in capacitance can be measured via a capacitance sensing circuit in which the capacitance sensor is disposed, connected, and/or in electrical communication with.

Relative terms such as "below" or "above" or "upper" or "lower" or "horizontal" or "vertical" may be used herein to describe a relationship of one element, feature, member, or component to another element, feature, member, or component as illustrated in the FIGs. It is understood that these terms are intended to encompass different orientations of the device in addition to the orientation depicted in the FIGs. Like numbers refer to like elements in the FIGs.

FIGS. 1 to 6 illustrate various views, embodiments, and/or aspects associated with airstream sensor devices, systems, and related methods. FIG. 1 is a block diagram of an airstream sensor system 10 according to some embodiments of the presently disclosed subject matter. Briefly, the airstream sensor system 10 comprises, consists, and/or consists essentially of at least one airstream sensor device 20 and at least one transmitter 30.

Pursuant to the present disclosure, a humidity sensor is combined with an air flow measurement device, such as a thermal probe, in a single, integrated device. This allow for simplified enthalpy measurement and velocity and/or air flow mass flow rate measurements by locating air flow, temperature and humidity substantially at the same location or locations within and air flow. Such can be particularly useful in relatively large cross-sectional flow environments, since in such environments, there can be variations in temperature, humidity, and the proportion of air, or mass flow, rates across the air flow profile. Thus, when attempting to measure humidity or enthalpy, taking a single point measurement of temperature, or a multiple point average of temperature, does not truly accurately the average temperature of such air flow. Positioning of multiple such devices of the present disclosure can alleviate this problem and allow for velocity-weighted mass flow, temperature, humidity, and enthalpy measurements to be accurately taken. Velocity-weighted temperature and humidity is desirable, since accurate velocity-weighted temperature and velocity-weighted humidity measurements facilitate a more accurate estimate of enthalpies. A device of the present disclosure thus allows for the generation of velocity-weighted temperature profiles, humidity profiles, mass flow rate profiles, and enthalpy profiles across an air flow.

Air flows do not generally mix uniformly, meaning, the temperatures and humidities at differing positions across the air flow vary one from another as a consequence of differences in mass flow rates across the air flow, which results in different enthalpies at differing positions across the air flow. Accordingly, a single point measurements or arithmetic averages of measurements of humidity are not adequate for determining, for example, the enthalpy of such air flow. Instead, velocity (and/or mass flow), temperature, and humidity measurements should thus be taken together, simultaneously at substantially the same location in order to obtain accurate velocity-weighted enthalpy measurements for the air flow.

The devices of the present disclosure, due to the humidity sensor being collocated with the temperature/flow sensor, allow for such simultaneous measurements at substantially the same location and thus allow for obtaining accurate enthalpy measurements for the air flow.

The sensor device 20 can comprise, for example, a portable airstream measuring instrument or a semi-permanently or permanently mounted airstream measuring instrument. Exemplary sensor devices 20 include devices having a combination of different sensors disposed thereon for collecting and/or measuring different data associated with an airstream. Such devices 20 may include, but are not limited to, handheld probes, handheld tubes, pitot arrays, mounted probes, combination damper/AFMS piezo rings, pitot-static tubes, pitot-static grids, flow capture hoods, multi-point duct averaging tubes or probes, single-point thermal meters, vortex shedders, measuring dampers, measuring stations, measuring louvers, or any other airstream/airflow measuring device not inconsistent with the instant disclosure. The transmitter 30 can comprise an integrated or remote physical hardware component that electrically communicates with the one or more devices 20 for receiving, processing, and communicating the data obtained therefrom.

The airstream sensor device 20 can further define a sensor support or housing configured to support or house a plurality of different types of sensors configured to measure and obtain different types of data, such as, temperature, airflow, and relative humidity data. In some embodiments, a single sensor device 20 can comprise a plurality of sensors disposed on, over, or in the housing thereof, the plurality of sensors can comprise at least one temperature sensor, at least one thermal dispersion airflow sensor, and at least one relative humidity (RH) sensor 24 that measure the respective airstream temperature, airflow and relative humidity. The temperature and airflow sensors are collectively labeled 22, as the temperature and airflow sensors are configured as a pair of thermistors including at least a first thermistor T1 and a second thermistor T2. The first thermistor T1 is a temperature sensor used to measure the temperature or an airstream. The second thermistor T2 is heated to a known temperature and used to measure the airflow via thermal dispersion techniques, whereby changes in resistance and temperature of the thermistor are correlated to the rate of airflow or velocity of an airstream. The thermal dispersion airflow sensors and temperature sensors are collectively referred to as airflow and temperature (AFT) sensors 22. The addition of one or more RH sensors 24 to a device having AFT sensors 22 improves the consistency of the airstream measurements being obtained, which in turn improves the calculated value for temperature, enthalpy, and airflow. Thus, the system 10 can provide more efficient control of airstreams in an HVAC system.

In certain embodiments, the AFT sensors 22 include at least one pair of thermistors. For example, the AFT sensors 22 can comprise one or more pairs of bead-in-glass thermistors that exhibit changes in resistance in response to an airstream passing over the device 20. The one or more RH sensors 24 are configured to exhibit changes in resistance, capacitance, or conductivity in response to the airstream passing over the device 20. Any type of RH sensor 24 not inconsistent with the instant disclosure can be disposed in the devices and systems described herein, including, for example, capacitive humidity sensors, resistive humidity sensors, or thermal conductivity humidity sensors.

Further, the devices 20 described herein can comprise an array of one or more AFT sensors 22 and at least one RH sensor 24 for estimating two or more of the temperature, thermal dispersion airflow, relative humidity, and enthalpy of an airstream. In further embodiments, the devices 20 described herein can comprise an array of one or more AFT sensors 22 and at least one RH sensor 24 for estimating three or more of the temperature, thermal dispersion airflow, relative humidity, and enthalpy of an airstream. In yet further embodiments, the devices 20 described herein can comprise an array of one or more AFT sensors 22 and at least one RH sensor 24 for estimating all four of the temperature, thermal dispersion airflow, relative humidity, and enthalpy of an airstream.

More than one AFT sensor 22 and/or pair of AFT sensors may be provided per device, more than two AFT sensors 22 and/or pairs of AFT sensors may be provided per device, more than three AFT sensors 22 and/or pairs of AFT sensors may be provided per device, or less than ten AFT sensors 22 and/or pairs of AFT sensors may be provided per device. Similarly, more than one RH sensor 24 may be provided per device, more than two RH sensors 24 may be provided per device, more than three RH sensors 24 may be provided per device, or less than ten RH sensors 24 may be provided per device. Any combination of different types and quantities of RH sensors 24 and AFT sensors 22 or pairs of AFT sensors not inconsistent with the instant disclosure can be provided per device 20.

Still referring to FIG. 1, and in some instances, the transmitter 30 is electrically connected to the airstream sensor device 20, and can obtain and calculate data including the temperature, airflow, relative humidity, and/or enthalpy of the airstream using data received from the combined AFT sensors 22 and RH sensor(s) 24. The temperature, airflow, relative humidity, and/or enthalpy of the airstream can be obtained and calculated for individual points in the airstream or averaged over multiple points in the airstream. Such data can be communicated to an acquiring source or destination (i.e., technician, building manager, building automation system, controller, etc.) and used for troubleshooting the system, assessing air quality or ventilation, or making decisions to heat or cool a space via outside air based on the obtained data, among other uses. In certain embodiments, the temperature and airflow can be obtained and calculated, for example, from signals indicative of changes in resistance for AFT sensors 22 (e.g., in the pair of thermistors) and the enthalpy of the airstream can be calculated, for example, from signals indicative of the change in resistance of the AFT sensors 22 and signals indicative of the change in resistance or capacitance of the RH sensor 24.

Figure 2:
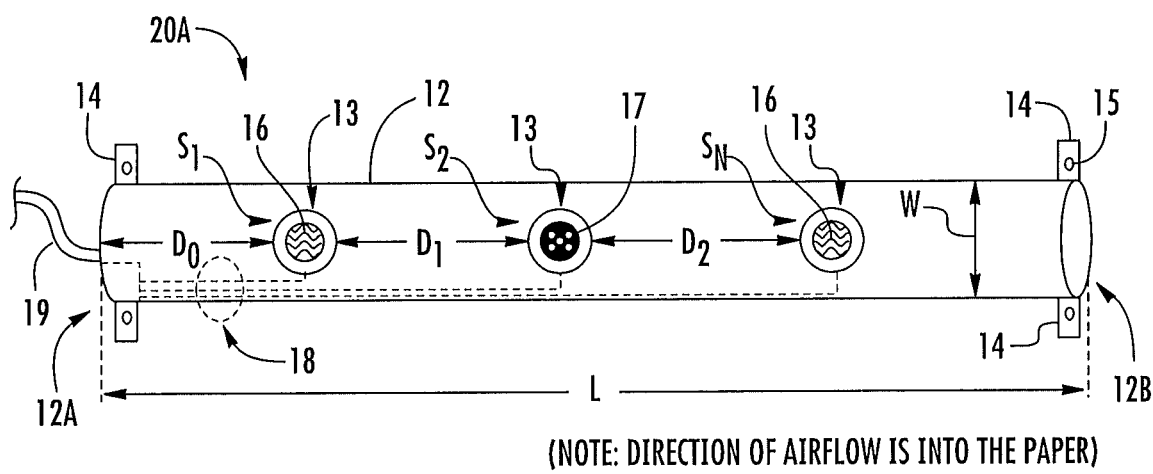
FIG. 2 is a schematic illustration of an airstream sensor device according to an embodiment of the presently disclosed subject matter.

In further instances, the device 20 and transmitter 30 communicate directly with each other, for example, via a wired communication link (e.g., cable 19, FIG. 2). For example, system 10 can comprise a "plug and play" system whereby multiple airflow sensor devices 20 can be plugged into transmitter 30 so that data can be easily acquired therefrom and sent to other entities for HVAC management and control. Alternatively, wireless communications may be used between device(s) 20 and transmitter 30, where desired. Notably, the transmitter 30 is fully independent of the sensor devices 20 and does not require field matching. Further, a single transmitter 30 can transmit the airflow, temperature, humidity, and/or enthalpy data (individual data points or averaged over multiple data points) to the acquiring source for further manipulation, troubleshooting, and/or making HVAC decisions in a building or structure.

As FIG. 1 further illustrates, the AFT sensor(s) 22 is/are connected to AFT sensing circuit(s) 26 and the RH sensor(s) 24 is/are connected to RH sensing circuit(s) 28. In certain embodiments, the AFT sensing circuit 26 is a resistance-sensing circuit configured to sense, detect, and/or measure changes in the resistance of and/or between at least one pair of AFT sensors 22. In some cases, the AFT sensors 22 include at least one pair of thermistors, in which one thermistor of the pair is a temperature sensing thermistor being heated to the temperature of the airstream and the other thermistor of the pair is a self-heated thermistor used to measure the airflow (i.e., the velocity or flow rate of the airstream) via thermal dispersion. The AFT sensing circuit 26 measures the resistance of the temperature sensing thermistor and the change in resistance between the temperature sensing thermistor and the self-heated thermistor. The AFT sensing circuit 26 then outputs the measured resistance data as a resistance sensor signal to the transmitter 30. The transmitter 30 then calculates the airflow and temperature of the airstream based on the resistance data. The transmitter 30 can calculate the enthalpy of the airstream from the temperature and humidity data obtained from AFT and RH sensing circuits 28. System 10 can calculate the volumetric or mass airflow, where desired.

Similarly, and in certain embodiments, the RH sensing circuit 28 is a resistance or capacitance sensing circuit configured to sense, detect, or otherwise measure the resistance or capacitance and/or changes in resistance or capacitance for the RH sensor 24 or sensors. In certain embodiments, the RH sensing circuit 28 detects changes in the resistance or capacitance of the one or more RH sensors 24 to determine the amount of moisture present in the airstream. The RH sensing circuit 28 outputs the resistance or capacitance data as a sensor signal to the transmitter 30. The transmitter 30 can use the signals derived from RH sensing circuit(s) 28 in combination with the signals derived from AFT sensing circuit(s) 26 to calculate the enthalpy of the airstream. The temperature, thermal dispersion airflow, enthalpy, and/or relative humidity parameters are useful for managing, monitoring, troubleshooting, and/or controlling aspects of an HVAC system.

Still referring to FIG. 1, and in some embodiments, the transmitter 30 comprises a processor 32, memory 34, and one or more interfaces 36. The interfaces 26 are configured to send and receive data in the form of analog output signals, digital output signals, infrared output signals, and/or radiofrequency (RF) output signals, where desired. The transmitter 30 may send and receive any type of signal not inconsistent with the disclosed subject matter. The transmitter 30 acquires or receives data (i.e., resistance and/or capacitance sensor signals) from at least one airstream sensor device 20, and in some embodiments, the transmitter 30 acquires or receives data from multiple devices 20. For example and in some embodiments, a single transmitter 30 can receive and process data from between 1 and 4 devices. However, a transmitter 30 that receives and processes data from more than 4 devices is also contemplated.

The processor 32 can receive and process data from the multiple sensor devices 20. The processor 32 can receive data in the form of signals indicative of resistance and/or capacitance changes, and process the data via executing an algorithm stored in memory 34. The multi-point data received from one or more devices 20 is used to calculate parameters such as the average airflow, temperature, and enthalpy of an airstream or individual parameters at discrete locations in an airstream. The processor 32 can comprise a physical hardware processor including a single core or multiple cores. The processor 32 may also be a virtual processor that runs on a hypervisor layer controlling remote access to the underlying processor hardware. The processor 32 can store the airstream data in storage 38. The data can comprise airflow, temperature, relative humidity, and/or enthalpy data being simultaneously or substantially simultaneously acquired by an acquirer 39 such as, without limitation, an HVAC user, an HVAC technician, an HVAC controller, a building management system or unit, a building automation system, a computing platform, or manually via an RF device during installation, maintenance, and/or troubleshooting operations. Additionally, the data can optionally be displayed on a graphical user interface of the transmitter 30 or the acquiring entity, where desired.

The transmitter memory 34 may be volatile or non-volatile memory that stores instructions executed by the processor 32. The memory 34 may be a physical memory chip or virtualized memory that is mapped to one or more physical memory chips by a hypervisor layer. In some embodiments, at least two or more of a temperature algorithm, a thermal dispersion airflow algorithm, a relative humidity algorithm, and an enthalpy algorithm are stored in the memory 34 for execution by the processor 32 to calculate the respective temperature, airflow, relative humidity, and enthalpy of an airstream from multiple points in the airstream. As noted earlier, individual temperature, airflow, or enthalpy values for each sensor in the system 10 can be calculated or averages of the airstream temperature, airflow, and enthalpy can be calculated. The temperature, airflow, and enthalpy values for various zones, devices 20, and/or locations in an HVAC system are calculated for use in controlling or managing the system. The processor 32 can execute algorithms stored in memory 34 for computing various airstream parameters and data.

The transmitter 30 is configured to send and receive data via the one or more interfaces 36. The temperature, airflow, RH, and/or enthalpy data may be simultaneously communicated as individual or averaged points to the acquirer 39 or acquiring entity in response to a request, an inquiry, a trigger, an alarm, according to a schedule, on-demand, or at any time and according to any method not inconsistent with the instant disclosure. The interfaces 36 can comprise one or more wired network interfaces, wireless network interfaces, RF interfaces, infrared interfaces, graphical user interfaces, touch screen interfaces, push-button interfaces, or any other type of interface not inconsistent with the instant subject matter.

The airstream data can be acquired from devices 20 directly or indirectly, and then processed into airstream data and sent to another entity (i.e., an acquirer 39) via interfaces 36. In some embodiments, the interfaces 36 are configured to receive electrical data (i.e., resistance or capacitance sensor signals) and then transmit the airstream parameters, simultaneously, to the acquirer 39 (e.g., a controller, user, building management system, reader, technician, computer, server, etc.). The acquirer 39 may use the airstream parameters to implement and/or effect management and control decisions in an HVAC system. One such decision may include analyzing the airflow, temperature, relative humidity, and/or enthalpy parameters to determine whether to heat or cool a space using air supplied from the HVAC system or outside air. After computing the various airstream parameters, the transmitter 30 can send the airstream data to a remote acquiring source (e.g., HVAC controller) or a local acquiring source (e.g., handheld reading device), which may be an HVAC control or management entity, where desired.

Additionally, the airstream data calculated at transmitter 30 may be displayed to a user via a display interface of the transmitter 30, where desired. It will further be appreciated that the transmitter 30 can be programmed to sound an audible alarm, emit a visible alarm, and/or transmit an alarm signal to the acquiring source when the temperature, airflow, enthalpy, and/or relative humidity measurements are outside of a specified range, exceed a specified limit, or fail to comply with any other programmed parameter consistent with the instant disclosure. The system and devices described herein are also ventilation compliant with the ASHRAE 62.2 standard.

It will be appreciated that FIG. 1 is for illustration purposes only, and that the sensor system 20 is not limited to the specific embodiment depicted in the figure. Numerous modifications and adaptations can be made without departing from the instant subject matter disclosed herein.

FIG. 2 is a schematic diagram of a probe airstream sensor device, generally designated 20A. The device 20A comprises, consists and/or consists essentially of a housing 12 and a plurality of sensors $S_1$-$S_N$ ("N" being a whole number integer >2) disposed on, over, and/or in the housing 12. The device 20A can be mounted in a duct or plenum space for obtaining various airstream parameters at individual or multiple points in an HVAC system. Any number (quantity) of sensors $S_1$-$S_N$ not inconsistent with the instant subject matter may be provided per device 20A, and the number of sensors provided on each device 20A can vary based on the length, width, or size of the device 20A being used to measure an airstream. The table below contains the exemplary number or quantity of sensors $S_N$ that may be disposed on, over, and/or at least partially within the devices 20A described herein. Notably, the devices 20A described herein employ multiple sensors $S_1$-$S_N$ for implementing multi-point sensing technology.

TABLE 1

| Quantity of Sensors Per Device |
|---|
| 3 |
| 4 |
| 5 |
| 6 |

TABLE 1-continued

Quantity of Sensors Per Device

| |
|---|
| 7 |
| 8 |
| 9 |
| 10 |
| 12 |
| 14 |
| 16 |
| 18 |
| 20 |
| 34 |
| 32 |
| <65 |
| <33 |
| <20 |

Turning now to the device housing 12, and in some cases, the housing 12 comprises a first end 12A and a second end 12B that is opposite from and/or opposes the first end. A plurality of sensor openings 13 are formed in the housing 12, from which the sensors $S_1$-$S_N$ can at least partially protrude, extend and/or by which the sensors $S_1$-$S_N$ are retained in the housing 12. In certain embodiments, the sensors $S_1$-$S_N$ comprise sensor inserts that are inserted, mounted, and/or retained within portions of the sensor openings 13. Where the sensors $S_1$-$S_N$ are sensor inserts, such inserts can be retained via one or more retaining members, such as set screws, pins, hooks, clips, clamps, or any other retaining member not inconsistent with the instant subject matter. The sensors $S_1$-$S_N$ can be provided on a downstream facing side or surface of the device 20A for facing the airstream and obtaining optimal readings. As noted in FIG. 2, the airstream being measured is directed into the paper, for example, along a z-axis.

In certain embodiments, the housing 12 comprises an elongated probe body or probe housing configured to house and/or at least partially enclose and retain the sensors $S_1$-$S_N$ therein. Alternatively, a non-elongated body is also contemplated, for example, as the devices described herein are not limited to probes, but may comprise any type of handheld or mounted airstream measurement device not inconsistent with the instant disclosure. The housing 12 can comprise any shape in a planar view, for example, an elongated tube/rod/bar/strut/shaft shape, a rectangular shape, a circular shape, a non-circular shape, a louver shape, a damper shape, or any other shape not inconsistent with the instant subject matter. The housing 12 can further comprise any sectional shape, for example, a circular sectional shape (i.e., for round ducts), a non-circular sectional shape, a square sectional shape, an oval sectional shape, a rectangular sectional shape, a symmetric sectional shape, an asymmetric sectional shape, a regular sectional shape, or an irregular sectional shape.

In some cases, the housing 12 comprises a hollow, tubular body having a conduit or aperture formed therein for encasing or enclosing various components, such as electrical circuitry components (e.g., PCBs), electrical connectors (e.g., traces, wires, interconnects, etc.), and/or communication links or components (e.g., cable(s)) for minimizing interference between such components and the airstream. The housing 12 can further comprise an aerodynamic shape and/or aerodynamic surfaces that are curved or rounded for minimizing disruptions in the airstream that may be caused as the airstream passes on, over, or through portions of the device 20A.

As FIG. 2 further illustrates, the housing 12 can comprise a length L and a width W. The width W is a diameter, for example, where the housing 12 has a circular cross-sectional shape. Exemplary housing lengths L and widths are set forth in the tables below. The housing 12 can comprise any size and/or shape not inconsistent with the instant subject matter disclosed herein.

TABLE 2

Exemplary Housing Length (L)

| |
|---|
| 4 inches (in)-20 feet (ft) |
| 1-20 ft |
| 1-16 ft |
| 2-20 ft |
| 2-16 ft |
| 2-10 ft |
| 5-10 ft |
| 4 in.-16 ft |
| 4 in.-10 ft |
| <20 ft |
| <16 ft |
| <10 ft |
| <2 feet |

TABLE 3

Exemplary Housing Width (W) in one or two directions

| |
|---|
| 1 millimeter (mm)-12 inches (in) |
| 1 mm-6 in |
| 1 mm-2 in |
| 1 mm-1 in |
| 5 mm-6 in |
| 5 mm-2 in |
| 5 mm-1.5 in |
| 1-6 in |
| 1-2 in |
| <12 in |
| <6 in |
| <2 in |

Turning now to the electrical sensing aspect of the airstream sensor devices 20A described herein, the plurality of sensors $S_1$-$S_N$ are configured to sense, measure, and/or detect changes in electrical resistance or capacitance in response to an airstream passing over the device 20A. The changes in electrical resistance or capacitance are used to calculate various airstream parameters associated with an airstream being measured by a device 20A. The parameters may include, for example and without limitation, the airflow, temperature, relative humidity, and/or enthalpy of the airstream being measured. Such parameters can be used to control, manage, troubleshoot, or monitor a heating, ventilating, and air conditioning (HVAC) system. The airstream measured via sensors $S_1$-$S_N$ can comprise a supply airstream, a return airstream, or an outside airstream being supplied and/or received from an outdoor (outside) source or location.

In some instances, the distance or space between adjacent sensors can be varied per device 20A and/or sensing application. For example, the distance between sensors may depend on the size of the duct or space in which the devices is to be located, meeting customer requirements, or applications in which more or less sensor points are needed to obtain a desired or required airstream sampling. In exemplary embodiments, the distance between sensors may measure between about 0.5 inches (in) and 6 feet (ft), or any subrange therebetween (e.g., 0.5-12 in, 0.5-6 in, 1-36 in, 1-24 in, 1-12 in, 1-6 in, 1-2 in, etc.) depending on the size and/or shape of the device 20A. The distance between sensors may be less than about 24 inches, less than about 12 inches, less than about 6 inches, or less than about 2 inches.

Additionally, and in further embodiments, adjacent sensors $S_1$-$S_N$ in a device are spaced apart at equal distances over the housing 12. Alternatively, adjacent sensors $S_1$-$S_N$ in a device are spaced apart at unequal distances over the housing 12. For example, the first sensor $S_1$ can be spaced apart from the adjacent second sensor $S_2$ by a first distance $D_1$ and the second sensor $S_2$ can be spaced apart from the adjacent $N^{th}$ sensor $S_N$ by a second distance $D_2$. The respective first and second distances $D_1$, $D_1$ can be equal or unequal. Where unequal, the first and second distances $D_1$, $D_1$ can vary by about 0.5 in, 1 in, 2 in, 0.5-12 in, 1-6 in, or less than 12 in. Sensors may be spaced apart at any distance (s) over housing 12, equal or unequal, not inconsistent with the instant subject matter. Such spacing may depend, for example and without limitation, on the size of the device 20A or the space incorporating the device 20A (e.g., a duct or plenum space). The distance(s) between the adjacent sensors $S_1$-$S_N$ can comprise any distance(s) not inconsistent with the instant subject matter. Although only three sensors are shown in FIG. 2 for illustration purposes only, it will be appreciated that a single device 20A can comprise more than three sensors.

Further, the end-most sensors (i.e., sensors $S_1$, $S_N$ that are disposed proximate the ends 12A, 12B) may be located or disposed at any inboard distance $D_0$ relative to the respective first and second ends 12A, 12B. The inboard distance $D_0$ can measure between 1 and 72 in, or any other subrange therebetween (e.g., 12-72 in, 12-60 in, 6-60 in, 1-24 in, 1-12 in, 1-6 in, <72 in, <60 in, <36 in, <24 in, <6 in, <4 in, etc.). The inboard distance $D_0$ may vary depending on the size of the device 20A and/or the space incorporating the device 20A (e.g., a duct or plenum space). The inboard distance $D_0$ can comprise any distance not inconsistent with the instant subject matter. Notably, the one or more RH sensors (described in more detail below) provided for each device 20A are not restricted to placement on, adjacent to, or at the duct wall, but can be positioned so that the sensors sample air from the bulk airstream. The RH sensors can be spaced apart from each duct wall by at least about 2 in, at least 4 in, at least 6 in, at least 12 in, at least 20 in, at least 36 in, or any distance between about 2-36 in. Such placement improves the measurements and renders the RH information obtained more consistent with other sensor readings.

The one or more of the sensor devices 20A can be sized and/or shaped for disposal in one or more duct(s), plenum space(s), transition space(s), elbow(s), and/or any other portion of an HVAC system not inconsistent with the instant subject matter. Notably, the length L of the device 20A can substantially correspond to an opening of a duct, the distance between opposing inner walls of a duct, or a distance between mounting surfaces in a space of an HVAC system. Mounting elements 14 are disposed at the first and/or second ends 12A, 12B of the device 20A for mounting, connecting, attaching and/or securing devices 20A to portions of the HVAC system.

The mounting elements 14 can comprise mounting brackets, plates, supports or any other type of mounting element not inconsistent with the instant application. The device 20A may be movable or rotatable relative to portions of the mounting elements 14 before being locked or fixedly retained in a given position. Further, the mounting elements 14 may extend, retract, or slide to change size, shape, or orientation. Any size and/or shape of mounting element 14 consistent with the instant subject matter can be used. The mounting elements 14 provide versatile mounting options which allow devices 20A and respective sensors $S_1$-$S_N$ to be placed in even the most challenging field locations for measuring the airstreams in such locations.

Device 20A may be permanently or semi-permanently locked or fixed in a given position and location in an HVAC system via mounting elements 14 and one or more fastening members 15. The fastening members 15 may include, without limitation, screws, nails, dowels, pins, hooks, fasteners, clips, clamps, or bolts used to secure the device 20A to the HVAC system via locking the device 20A within a portion of mounting element 14. For example, the fastening members 15 can extend through portions of the device 20A, mounting element 14, and/or adjacent HVAC structure (e.g., an inner wall of a duct, a wall of a plenum space, etc.) to secure the device 20A to the HVAC system.

In some cases, the housing 12 and/or mounting elements 14 can comprise or be formed from a metal or a metal alloy, such as aluminum, stainless steel, copper, or any other metal or metal alloy not inconsistent with the instant subject matter. The metal or metal alloy forming the housing 12 and/or mounting elements 14 can optionally be treated (e.g., via heat treating, anodizing, coating, passivating, chemical treating, mechanical treating, etc.) for improved stability and durability, where desired.

Each device 20A is configured to measure at least the airflow, temperature, and relative humidity of an airstream that passes through various points and locations in the HVAC system. The measurements can be used, for example and without limitation, for outdoor air delivery monitoring, differential airflow tracking, troubleshooting, HVAC control and management, assuring compliance with ventilation requirements, system performance monitoring, or any other application not inconsistent with the instant subject matter. In certain embodiments, the airflow, temperature, and relative humidity measurements are associated with a return, supply, and/or outside airstream in an HVAC system.

The sensor measurements can be used to determine the source of the supply airstream, as well as the timing and/or duration of using the source of the supply airstream. For example, the measurements can be used to determine whether the source of the supply airstream is an outside airstream or a cooled/heated airstream supplied by the HVAC system. Cooling or heating a structure via outside air for any period of time advantageously allows the respective HVAC compressor or heating elements of the HVAC system to be turned off, which can contribute to significant energy savings and improves the energy efficiency of the respective HVAC system.

Notably, the temperature and relative humidity measurements obtained via sensors $S_1$-$S_N$ can be used to calculate the enthalpy of the airstream passing over each device 20A for determining when to use conditioned or heated air versus outside air. The airflow measurements obtained via sensors $S_1$-$S_N$ are used to assure compliance with ventilation and air quality requirements. Making decisions, for example, in regards to whether to use HVAC air (i.e., heated or cooled supply air) or outside air based on the temperature, enthalpy and airflow measurements allows energy savings to be realized without having to compromise indoor air quality, required ventilation, and/or comfort. By increasing the amount of outdoor air used to cool a structure when the enthalpy of the outside air temperature is lower in temperature and/or enthalpy of the return air, energy and costs savings may be realized. The sensor devices 20A described herein utilize co-located and/or co-planar sensors $S_1$-$S_N$, which further improves the accuracy and repeatability of the airstream measurements being obtained.

Still referring to FIG. 2, at least some of the sensors $S_1$-$S_N$ comprise AFT sensors 16 configured to sense both the airstream temperature and the airflow of an airstream passing over the respective device 20A. The AFT sensors 16 are resistance sensors that measure/detect the resistance or changes in resistance as the airstream temperature increases or decreases. The temperature and airflow data can be calculated and determined, in part, by comparing the resistance data obtained from the AFT sensors 16 during operation to resistance data obtained during calibration of the sensors 16. In one implementation, the AFT sensors 16 can comprise thermistors that meet NIST-traceable calibration standards, which are factory calibrated for airflow ranges of 0 to 5,000 feet per minute (fpm) at sixteen calibration points and calibrated for temperature ranges of range of −20 to 160° F. and three calibration points. The AFT sensors 16 are in one implementation accurate within +/−2% of the airstream airflow and within +/−0.15° F. of the airstream temperature.

In some cases, the AFT sensors 16 comprise thermistors by which temperature and airflow can be calculated based on changes in resistance through a resistance sensing circuit. The AFT sensors 16 can comprise, or be formed from, hermetically sealed, bead-in-glass thermistor probes, which are accurate and relatively durable and stable at temperatures between −20 and 160 degrees Fahrenheit (° F.), or any subrange thereof, and a humidity between 0 and 100%. In one implementation, at least one AFT sensor 16 can be a thermistor configured to measure the airstream temperature and at least one other AFT sensor 16 is a thermistor that is self-heated to a preferential temperature by a constant power for measuring airflow (i.e., an airstream velocity or flow rate). In one implementation, the preferential temperature is at least 10 degrees Fahrenheit (° F.) above the airstream temperature for detecting the airflow, at least 20° F. above the airstream temperature for detecting the airflow, at least at least 50° F. above the airstream temperature for detecting the airflow, or between 10-60° F. above the airstream temperature. As the airstream velocity or flow rate increases, the temperature difference between the AFT sensors 16 decreases. The temperature difference is reflected as a difference and/or change in resistance values across the pair of AFT sensors 16. The AFT sensors 16, via a resistance-sensing circuit, will detect the changes in resistance and communicate the changes as output resistance sensor signals carried by electrically conductive circuit elements 18 and an output cable 19. The output resistance sensor signals are sent to and received by a transmitter (i.e., 30, FIG. 1).

Further, the sensors $S_1$-$S_N$ comprise at least one RH sensor 17 configured to measure the relative humidity of the airstream passing over device 20A. In some embodiments, the RH sensor is a capacitive type humidity sensor comprising a hygroscopic material, such as a polymeric humidity-sensing film, disposed between electrodes. The hygroscopic material can comprise a thermo-set polymer, a thermoplastic polymer, or any other type of material not inconsistent with the instant subject matter.

A capacitance sensing circuit is configured to detect changes in capacitance of the RH sensor 17 and determine the amount of moisture present in the airstream. The capacitance sensing circuit is configured to detect the capacitance (or changes in capacitance) of the humidity RH sensor 17 and communicate the capacitance information as one or more output capacitance sensor signals via electrically conductive circuit elements 18 and output cable 19. The output capacitance sensor signal is sent to and received by a transmitter (i.e., 30, FIG. 1). The transmitter can utilize the signals received from the sensor device 20A to calculate various airstream parameters, such as the temperature, airflow, and enthalpy of the airstream. The airstream parameters can be output to an acquiring entity or acquirer (i.e., 39, FIG. 1), which may use the output for controlling, managing, and/or monitoring aspects of an HVAC system. Systems utilizing the airstream sensor devices 20A described herein may be more energy efficient, cost efficient, spatially efficient, and may have improved comfort during heating and/or cooling for a space, whether using conditioned or outside air.

Further in regards to FIG. 2, it is noted that the first end 12A of the housing 12 forms a proximal end that is more proximal to the output cable 19 of the device 20A and the second end 12B forms a distal end that is more distal to the output cable 19. The sensors $S_1$-$S_N$ in FIG. 2 are but one embodiment of the exemplary sensor locations, spatial locations, spacing distances, and sensor ordering. For example, as FIG. 2 illustrates, the AFT sensors 16 are disposed proximate the first and second ends 12A and 12B and the RH sensor 17 is disposed proximate a center point of the housing 12. However, it is understood that the RH sensor 17 may also be disposed proximate the first and/or second ends 12A, 12B and the AFT sensors 16 may be disposed proximate the center point of the housing 12. Further, the AFT sensors 16 may be directly adjacent to each other or directly adjacent to one or more RH sensors 17. It is also contemplated that multiple RH sensors 17 are disposed directly adjacent to each other within the housing 12. More than one RH sensor 17 may be provided per device 20A, where desired. Each sensor $S_1$-$S_N$ is configured to communicate electrical data, signals, or information (e.g., resistance or capacitive sensor signals) to the output cable 19 via various circuit elements 18 comprising electrical connectors or components (e.g., traces, wires). A single output cable 19 can communicate the data received from the multiple sensors $S_1$-$S_N$ to a transmitter. The transmitter can serve as a single point of communication configured to collect all sensor signals from sensor device 20A and transmit all outputs to a data acquisition source.

It is appreciated that FIG. 2 is for illustration purposes only, and that the sensor device 20A is not limited to the specific embodiment depicted in the figure. Numerous modifications and adaptations can be made without departing from the instant subject matter disclosed herein.

FIGS. 3A-5E are sectional views of various different sizes and/or shapes of HVAC ducts having one or more airstream sensor devices 20A disposed therein according to embodiments of the presently disclosed subject matter. Each device 20A can connect to a transmitter 30. In FIGS. 3A-5E, the airstream being measured is directed into the paper along the z-axis. The sensor systems 10 and devices 20A set forth herein can also be disposed in plenum space(s), transition space(s), elbow(s), and/or any other portion of an HVAC system not inconsistent with the disclosed subject matter.

FIGS. 3A-3D illustrate round ducts 40A-40D that have a circular or substantially circular cross-sectional shape and FIGS. 4A-4D illustrate square ducts 50A-50D having a squared or substantially squared cross-sectional shape. The ducts in FIGS. 3A-4D comprise a width X in two directions, which may be a diameter where circular ducts are provided. Exemplary duct widths X are in the table below.

TABLE 4

Figure 3A:
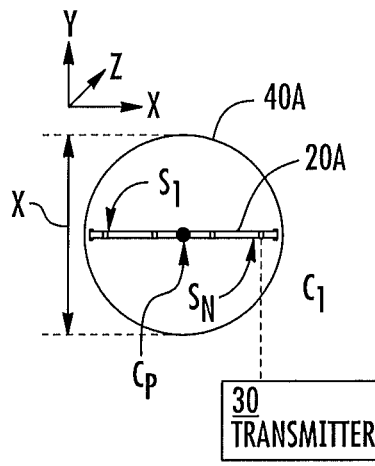
FIGS. 3A-5E are sectional views of heating, ventilating, and air conditioning (HVAC) ducts having airstream sensor devices disposed therein according to embodiments of the presently disclosed subject matter.
Figure 3B:
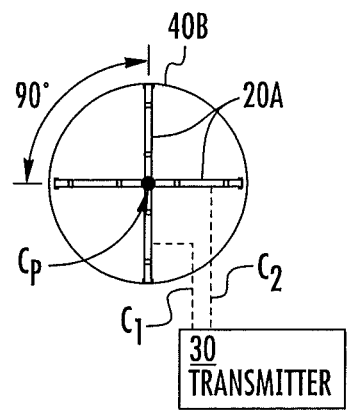
Figure 3C:
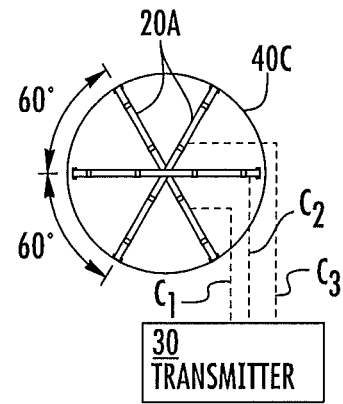
Figure 3D:
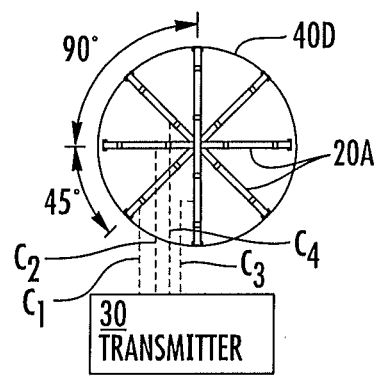

Exemplary Duct Diameters or Widths
(X) for Square and Circular Ducts 5 inches (in)-24 feet (ft)
1-20 ft
1-16 ft
2-20 ft
2-16 ft
2-10 ft
5-20 ft
5-10 ft
5 in.-16 ft
5 in.-10 ft
<50 ft
<10 ft
<2 ft Referring now to FIGS. 3A-3D, the respective ducts 40A-40D comprise a conduit formed between inner walls. A plurality of airstream sensor devices 20A are positioned, mounted, attached and/or otherwise disposed between the inner walls of the respective ducts 40A-40D. FIG. 3A illustrates a single sensor device 20A positioned in the duct 40A and FIGS. 3B-3D illustrate multiple devices 20A disposed in the respective ducts. Where multiple devices 20A are provided, each device is spaced apart from the adjacent devices along the depth of the duct, for example, in the z-direction. The multiple devices 20A can advantageously provide, position, or locate sensors $S_1$-$S_N$ across the entire width X lengths of the duct, which improves the air sampling. Notably, the sensors $S_1$-$S_N$ of each device 20A are disposed along a same plane in the duct, so that the temperature, airstream, and relative humidity readings are sampled from a same plane within a duct.

As FIG. 3A illustrates, the sensor device 20A can pass through a center point $C_P$ of the duct 40A. The device 20A is electrically connected to a transmitter 30 via a wired or wireless communication link $C_1$. As FIG. 3B illustrates, at least two sensor devices 20A can intersect proximate the center point $C_P$ of the duct 40B. The sensor devices 20A can be orthogonally disposed relative to each other within and the duct 40B width W. Each 20A is electrically connected to a single transmitter 30 via wired or wireless communication links $C_1$ and $C_2$.

As FIG. 3C illustrates, three sensor devices 20A can intersect proximate the center point $C_P$ of the duct 40C. The sensor devices 20A can be acutely angled with respect to each other within the duct 40B. Each device can radially extend from the center point $C_P$ of the duct 40C for sampling air at locations disposed across the entire radius and diameter of the duct. Each device 20A is electrically connected to a single transmitter 30 via wired or wireless communication links $C_1$ to $C_3$.

FIG. 3D illustrates four sensor devices 20A disposed in a duct 40D. The devices intersect proximate the center point $C_P$ of the duct 40D, and portions of each device 20A are acutely angled with respect to other devices 20A, or portions thereof. Notably, the devices 20A include a plurality of sensors spaced across the full width X of the duct 40D for improved sampling. The sensor devices 20A are symmetrically disposed relative to the center point $C_P$ of the duct 40C so that symmetric portions or locations of the airstream in the duct 40D are obtained. Each device 20A is electrically connected to a single transmitter 30 via wired or wireless communication links $C_1$ to $C_4$. Having multiple devices 20A connected to transmitter 30 is advantageous in terms of ease of manufacture, ease of installation, ease of maintenance, ease of connectivity thereto, and improved troubleshooting.

Figure 4A:
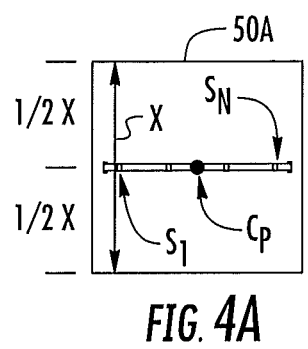
Figure 4B:
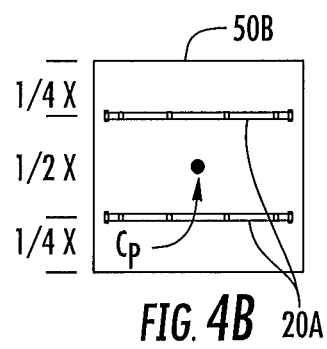
Figure 4C:
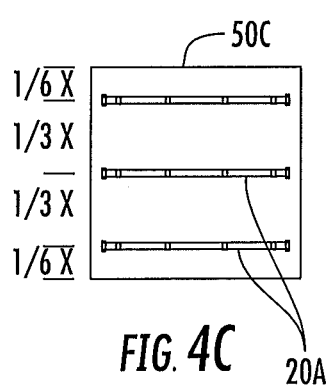
Figure 4D:
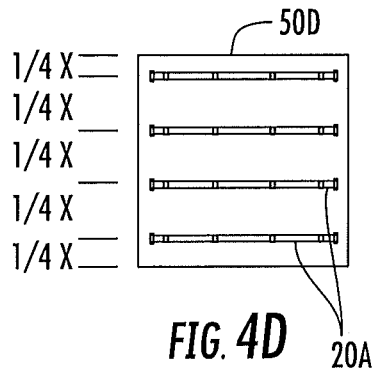

FIGS. 4A-4D illustrate airstream sensor devices 20A disposed in square shaped ducts 50A-50D, respectively. The sensor devices 20A can intersect proximate the center point $C_P$ of the duct 50A as illustrated in FIG. 4A or not intersect proximate the center point $C_P$ of the duct 50B as illustrated in FIG. 4B. Multiple sensor devices 20A can be symmetrically disposed relative to at least one axis of symmetry passing through the center point $C_P$ of the duct 40B for improved, symmetric airstream sampling. Symmetric sampling can improve the monitoring and, thus, control over the HVAC system for improved energy efficiency. In FIG. 5D, the devices 20A are symmetric about more than one axis of symmetry passing through the center point $C_P$, for example, the devices 20A are symmetric about axes disposed along each of the x-, y-, and z-axes. The devices 20A may be mirror and/or rotationally symmetric.

Further, in FIG. 4A a single sensor device 20A is mounted proximate the midpoint of the duct, such that approximately one-half of the duct 40A is above the device 20A and approximately one-half of the duct 40B is below the device 20A. In FIG. 4B, the devices 20A are mounted at various locations (i.e., heights or depths) within the duct 40B that are proximate one-quarter of the width X away from the upper and lower faces of the duct. In FIG. 4C, the devices 20A are positioned proximate the midpoint of the duct at heights or depths of about ⅙ the duct width X. In FIG. 4D, the devices 20A are located at heights or depths of about ⅛ the duct width X. Where multiple devices 20A are disposed in a duct, the devices can be vertically spaced and spaced equal distances apart and extend length-wise along substantially parallel planes within the respective duct. As FIGS. 4A-4D illustrate, the devices 20A can be spaced apart in the y-axis at equal or unequal distances. Equal spacing of devices 20A along the x- and z-axes is also contemplated.

Figure 5A:
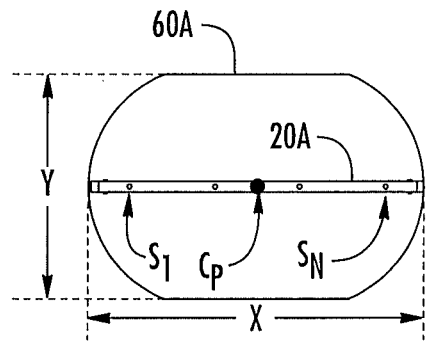
Figure 5B:
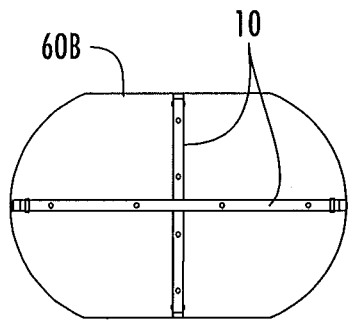
Figure 5C:
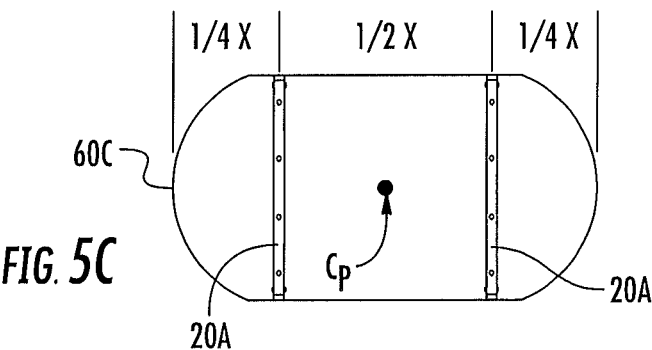
Figure 5D:
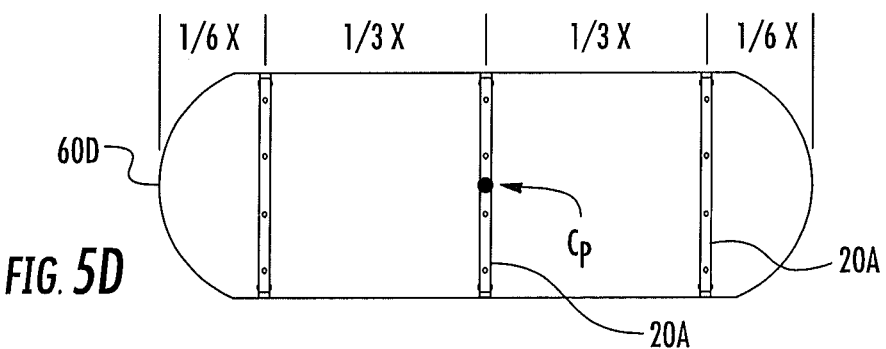
Figure 5E:
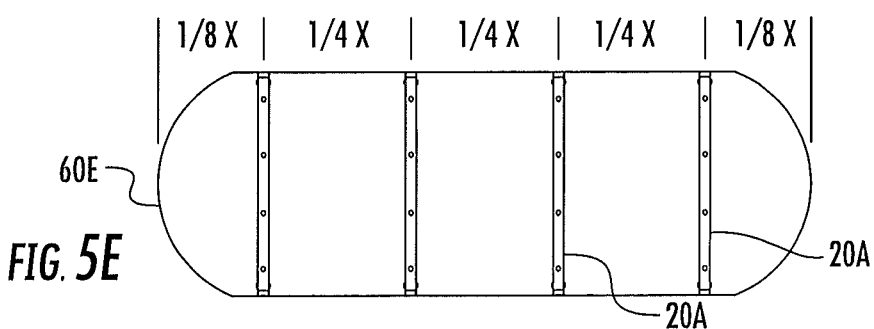

FIGS. 5A-5E illustrate one or more airstream sensor devices 20A disposed in oval shaped ducts 60A-60E, respectively. The sensor devices 20A can intersect at a location proximate the center point $C_P$ of the duct 60A as illustrated in FIG. 5A or not pass through the center point $C_P$ of the duct as illustrated in FIG. 5C. The sensor devices 20A can be symmetrically disposed about one or more axes of symmetry passing through the center point $C_P$ of the ducts for improved airstream sampling, which facilitates improved monitoring and, thus, control over the HVAC system for improved energy efficiency The sensor devices 20A may be spaced apart in the horizontal direction (i.e., along the x-axis) at equal or unequal distances, and each device 20A may extend length-wise along substantially parallel planes within the ducts. The elongated axis of each sensor device 20A can be substantially parallel to the maximum width or height Y of the duct in the y-direction. Alternatively, the sensor devices 20A may be substantially parallel to a maximum width X of the duct in the x-direction. As FIGS. 5A-5E illustrate, one, two, three or four sensors 20A may be disposed in a given duct. The sensor devices face the airstream supplied to a duct in the z-direction for improved measurements.

FIG. 6 is a block diagram of an exemplary method, generally designated 70, for measuring, collecting, or detecting airstream parameters of an airstream disposed in the path of an airstream sensor device according to embodiments of the presently disclosed subject matter.

At 72 the method comprise receiving, at a transmitter, a plurality of electrical signals from an airstream sensor device positioned in an airstream, the electrical signals being indicative of a temperature, a thermal dispersion airflow, and a relative humidity of the airstream.

At 74, the method further comprises processing, at the transmitter, the electrical signals to obtain a calculated temperature, a calculated airflow, and an enthalpy of the airstream.

At 76, the method further comprises transmitting the calculated temperature, the calculated airflow, and the enthalpy to an acquirer. The relative humidity may also be transmitted The airflow data or parameters, including the temperature, thermal dispersion airflow velocity, relative humidly, and enthalpy can be calculated by a transmitter (30, FIG. 1) and sent to an acquiring source, destination, or entity for use in making decisions relating to HVAC system management and control.

FIG. 7 is a block diagram of an exemplary method, generally designated 80, for monitoring an airstream according to embodiments of the presently disclosed subject matter.

At 82, humidity, airflow, and temperature measurements for an airstream are received at a first device.

At 84, the enthalpy of the airstream is calculated at the first device.

At 86, the humidity, airflow, temperature, and enthalpy are communicated to a second device via the first device.

Referring to FIG. 7, the first and second devices can comprise any device hereinabove not inconsistent with the instant disclosure. For example, and in certain embodiments, the first and second devices can comprise a transmitter and building management system device, respectively. The humidity, airflow, and temperature measurements may be received for multiple individual points, which may optionally be averaged and/or weighted prior to communication to the second device. For example, the humidity, airflow, and temperature measurements may be measured and obtained for multiple points in an airstream, averaged by the number of points, and the average values are communicated to the second device. In other aspects, individual (non-averaged) humidity, airflow, and temperature measurements are communicated to the second device. In yet further aspects, a velocity weighted temperature is calculated and communicated to the second device. Velocity weighted temperature is not merely a straight average of the temperature points, but also takes into account the velocity at the temperature measurement point compared to the others. Thus, the temperature measurement being communicated to the second device is weighted by the velocity (flow amount).

Other embodiments of the current subject matter will be apparent to those skilled in the art from a consideration of this specification or practice of the subject matter disclosed herein. Thus, the foregoing specification is considered merely exemplary of the current subject matter with the true scope thereof being defined by the following claims.

What is claimed is:

1. A system, comprising:
    at least one airstream sensor device configured to be disposed in an air flow conveyance structure of a Heating, Ventilation and Air Conditioning ("HVAC") system, and comprising
        a housing comprising an elongate hollow shaft configured to extend between a first inner wall of the air flow conveyance structure and an opposing second inner wall of the air flow conveyance structure,
        a plurality of openings formed in the elongate hollow shaft and spaced apart along an elongate length of the housing,
        a plurality of sensors respectively disposed in the plurality of openings formed in the elongate hollow shaft of the housing, where a temperature and an airflow rate are simultaneously measured at each given location of a plurality of different locations within a single cross-sectional plane of the air flow conveyance structure, and a relative humidity of a single airstream is measured at a given location along the single cross-sectional plane; and
    a transmitter communicatively coupled to the at least one airstream sensor device and configured to
        receive relative humidity measured values, temperature measured values, and airflow measured values from the at least one airstream sensor device,
        compute an airstream velocity value, at each location of the different locations within the single cross-sectional plane of the air flow conveyance structure, using a respective one of the temperature measured values and a respective one of the airflow measured values,
        generate a mass flow rate profile of the single airstream based on the airstream velocity values, the mass flow rate profile indicating variations of mass flow rate across an air flow of the single cross-sectional plane of the air flow conveyance structure,
        compute a velocity weighted temperature value for the single airstream by weighting each of the temperature measured values by a respective one of the airstream velocity values, wherein the velocity weighted temperature value accounts for variations in at least one of the temperature and the airstream's velocity within the single cross-sectional plane at the plurality of different locations in the air flow conveyance structure;
        use the humidity measured values and the velocity weighted temperature value to determine a psychrometric property at a plurality of points along the single cross-sectional plane; and
        cause operations of the HVAC system to be controlled based on the determined psychrometric properties and the mass flow rate profile.

2. The system according to claim 1, wherein the psychrometic property comprises a velocity weighted enthalpy value comprising a enthalpy value determined based on a temperature measured values that is weighted by a respective one of the airstream velocity values.

3. The system according to claim 2, wherein the transmitter is further configured to communicate at least one of the humidity measured values, the temperature measured values, the airstream velocity values, the velocity weighted temperature value, and the enthalpy value to an external device.

4. The system according to claim 2, wherein control of the HVAC system comprises adjusting at least one parameter of the HVAC system based on the determined psychrometric property.

5. The system according to claim 1, wherein the transmitter is further configured to compute a velocity weighted humidity value for the single airstream by weighting each of the humidity measured values by a respective one of the airstream velocity values.

6. The system according to claim 5, wherein the psychrometric property is determined using the velocity weighted humidity value in addition to the velocity weighted temperature value.

7. The system according to claim 1, wherein the transmitter is further configured to receive airflow measured values from airstream sensor devices including the at least one airstream sensor device, and determine at least two airflow velocity values based on the airflow measured values.

8. The system according to claim 7, wherein the at least two airflow velocity values are used to compute the velocity weighted temperature value in addition to the temperature measured values.

9. The system according to claim 1, wherein the at least one airstream sensor device comprises a relative humidity sensor that is disposed proximate a center point of the housing.

10. The system according to claim 1, wherein at least one airstream sensor device-comprises multiple relative humidity sensors.

11. The system according to claim 1, wherein the housing is an elongated probe housing comprising a first end and a second end, and sensors of the at least one airstream sensor device are spaced apart at equal distances between the first end and the second end.

12. The system according to claim 1, wherein the plurality of sensors comprise at least one bead-in-glass thermistor.

13. The system according to claim 1, wherein the plurality of sensors comprise at least one sensor that meets NIST-traceable calibration standards.

14. The system according to claim 1, wherein the at least one airstream sensor device is a probe, a pilot tube, a damper, a flow capture hood, a thermal meter, a vortex shedder, or a measuring louver.

15. The system according to claim 1, wherein the elongate hollow shaft is configured to extend from a first inner wall of the air flow conveyance structure to an opposing second inner wall of the air flow conveyance structure.

16. The system according to claim 15, wherein the at least one airstream sensor device further comprises
a first mounting element coupled to a proximal end of the housing and configured to facilitate mounting of the airstream sensor device on the first inner wall of the air flow conveyance system, and
a second mounting element coupled to a distal end of the housing and configured to facilitate mounting of the airstream sensor device on the second inner wall of the air flow conveyance system.

17. The system according to claim 15, further comprising a first airstream sensor device and a second air stream sensor device having center portions that overlap each other proximate to a center point of the air flow conveyance system, when the first and second airstream sensor devices are mounted in the air flow conveyance system.

18. The system according to claim 1, wherein the air flow conveyance system comprises at least one of an air duct, a plenum, a damper assembly, an air intake assembly and an air moving equipment.

19. The system according to claim 1, wherein the transmitter is further configured to communicate the airstream velocity values to an external device.

20. The system according to claim 1, wherein the at least one airstream sensor device further comprise a sensing circuit configured to measure a change in resistance between a first sensor of the plurality of sensors that is heated to a temperature of the single airstream and a second sensor of the plurality of sensors that is self-heated to a given temperature.

21. The system according to claim 1, wherein the transmitter is further configured to receive the measured change in resistance from the at least one airstream sensor device, and the airstream velocity values are computed based on the measured change in resistance.

22. A method, comprising:
measuring a humidity and a temperature by a plurality of sensors that are (i) respectively disposed in a plurality of openings formed in and spaced apart along an elongate hollow shaft of at least one air stream sensor device, and (ii) arranged symmetrically within a single cross-sectional plane of an air flow conveyance structure of a Heating, Ventilation and Air Conditioning ("HVAC") system, wherein the elongate hollow shaft extends between a first inner wall of the air flow conveyance structure and an opposing second inner wall of the air flow conveyance structure;
receiving, by a transmitter, a humidity measurement value, airflow measurement value and temperature measurement values from the plurality of sensors, the humidity measurement value representing a relative humidity of a single airstream that was measured at a given location along the single cross-sectional plane, and the temperature measurement values representing a temperature of the single airstream measured at a plurality of different locations within the single cross-sectional plane;
using, by the transmitter, a respective value of the temperature measurement values and a respective value of the airflow measurement values to compute an airstream velocity value at each location of the different locations within the single cross-sectional plane of the air flow conveyance structure;
generating a mass flow rate profile of the single airstream based on the airstream velocity values, the mass flow rate profile indicating variations of mass flow rate across an air flow within the single cross-sectional plane of the air flow conveyance structure,
computing, by the transmitter, a velocity weighted temperature value for the single airstream by weighting each of the temperature measurement values by a respective one of the airstream velocity values, where the velocity weighted temperature value accounts for variations in at least one of the temperature and the airstream's velocity at a plurality of different locations within the single cross-sectional plane in the air flow conveyance structure;
using, by the transmitter, the humidity measurement values and the velocity weighted temperature value to determine a psychrometric property associated with the airstream; and
causing, by the transmitter, operations of the HVAC system, a building automation system or an application controller to be controlled based on the determined psychrometric property and the mass flow rate profile.

23. An airstream sensing system, comprising:
an airstream sensor device comprising
a housing comprising an elongate hollow shaft having a plurality of openings formed therein and spaced apart along an elongate length of the elongate hollow shaft, and
a plurality of sensors respectively disposed in the plurality of openings formed in the elongate hollow shaft of the housing, the plurality of sensors configured to (i) measure a temperature and a thermal dispersion airflow at a plurality of different locations within a single cross-sectional plane of an air flow conveyance structure and (ii) measure a humidity of a single airstream at a given location along the single cross-sectional plane, each of the plurality of sensors being configured to generate electrical signals associated with the single airstream passing over the airstream sensor device; and a transmitter in electrical communication with the airstream sensor device, and configured to receive the electrical signals comprising thermal dispersion airflow measurement values, humidity measurement values and temperature measurement values, compute an airflow velocity valueu, at each location of the different locations within the single cross-sectional plane of the air flow conveyance structure, using a respective one of the temperature measurement values and a respective one of the thermal dispersion airflow measurement values, generate a mass flow rate profile of the single airstream based on the airstream velocity values, the mass flow rate profile indicating variations of mass flow rate across an air flow within the single cross-sectional plane of the air flow conveyance structure, compute a velocity weighted temperature value for the single airstream by weighting each of the temperature measurement values by a respective one of the airflow velocity values, wherein the velocity weighted temperature value accounts for variations in at least one of the temperature and the single airstream's velocity within the single cross-sectional plane at the plurality of different locations in the air flow conveyance structure of a Heat, Ventilation and Air Conditioning ("HVAC") system;

use the humidity measurement values and the velocity weighted temperature value to determine a psychrometric property associated with the single airstream; and cause operations of the HVAC system to be controled based on the determined psychrometric property and the mass flow rate profile.

24. The airstream sensing system according to claim 23, further comprising a plurality of airstream sensor devices from which the transmitter is configured to receive electrical signals.

25. The airstream sensing system according to claim 23, wherein the transmitter is configured to simultaneously output the velocity weighted temperature value, the airflow velocity values, and the psychrometric property.

26. The airstream sensing system according to claim 23, wherein the airstream sensor device comprises between two to sixteen temperature sensors, two to sixteen thermal dispersion airflow sensor, and two to four relative humidity sensors.

27. The airstream sensing system according to claim 23, wherein the airstream sensor device comprises two or more relative humidity sensors.

28. The airstream sensing system according to claim 23, wherein the transmitter is integrated with the airstream sensor device.

29. The airstream sensing system according to claim 23, wherein the transmitter is remote from the airstream sensor device.

30. A method of measuring airstream parameters, comprising:

symmetrically measuring a thermal dispersion, a humidity and a temperature of a single airstream by a plurality of sensors that are (i) respectively disposed in a plurality of openings formed in and spaced apart along an elongate hollow shaft of an air stream sensor device, (ii) electrically isolated from each other, (iii) arranged symmetrically within a single cross-sectional plane of an air flow conveyance structure of a Heating, Ventilation and Air Conditioning ("HVAC") system, (iv) configured to measure a temperature and an airflow at a plurality of different locations within the single cross-sectional plane, and (v) configured to measure a humidity of the single airstream at a given location along the single cross-sectional plane, wherein the elongate hollow shaft extends between a first inner wall of the air flow conveyance structure and an opposing second inner wall of the air flow conveyance structure;

receiving, at a transmitter, a plurality of electrical signals that are generated by the single airstream sensor device and that comprise thermal dispersion airflow measurement values, humidity measurement values and temperature measurement values;

computing, by the transmitter, an airflow velocity value at each location of the plurality of different locations within the single cross-sectional plane based on a respective one of the thermal dispersion airflow measurement values and a respective one of the temperature values;

generate a mass flow rate profile of the single airstream based on the airstream velocity values, the mass flow rate profile indicating variations of mass flow rate across an air flow within a single cross-sectional plane of an air flow conveyance structure, computing, by the transmitter, a velocity weighted temperature value for the single airstream by weighting the temperature measurement value by the airflow velocity values, wherein the velocity weighted temperature value accounts for variations in at least one of the temperature and the single airstream's velocity at a plurality of different locations within the single cross-sectional plane;

using, by the transmitter, the humidity measurement values and the velocity weighted temperature value to determine a psychrometric property associated with the airstream; and causing, by the transmitter, operations of the HVAC system, a building automation system or an application controller to be controlled based on the determined psychrometric property and the mass flow rate profile.

31. The method according to claim 30, further comprising displaying the airflow velocity values, the velocity weighted temperature value, and the psychrometric property on a display screen of the transmitter.

32. The method according to claim 30, wherein the airstream sensor device is disposed in a supply airstream, a return airstream, or an outside airstream.

* * * * *